(12) United States Patent
Duncan

(10) Patent No.: US 10,133,317 B2
(45) Date of Patent: Nov. 20, 2018

(54) COMPUTING DEVICE WITH MULTIPLE DISPLAYS

(75) Inventor: Cameron C. Duncan, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2749 days.

(21) Appl. No.: 11/796,252

(22) Filed: Apr. 27, 2007

(65) Prior Publication Data

US 2008/0270899 A1 Oct. 30, 2008

(51) Int. Cl.
*G06F 1/16* (2006.01)
*G06F 3/0354* (2013.01)

(52) U.S. Cl.
CPC .......... *G06F 1/1692* (2013.01); *G06F 1/1616* (2013.01); *G06F 3/03547* (2013.01)

(58) Field of Classification Search
USPC .................. 715/771, 773, 831, 864–865
See application file for complete search history.

(56) References Cited

U.S. PATENT DOCUMENTS

| | | |
|---|---|---|
| 5,952,998 A | 9/1999 | Clancy et al. |
| 6,670,950 B1 | 12/2003 | Chin |
| 6,850,767 B1* | 2/2005 | Maxymych ........... G06F 1/1616 362/154 |
| 6,859,219 B1* | 2/2005 | Sall .............................. 715/764 |
| 7,030,860 B1 | 4/2006 | Hsu et al. |
| 7,154,453 B2* | 12/2006 | Numano ............... G06F 1/1616 345/1.1 |
| 7,388,578 B2* | 6/2008 | Tao ....................... G06F 1/1624 345/158 |
| 7,411,582 B2* | 8/2008 | Toepke et al. ............... 715/825 |
| 7,990,338 B2* | 8/2011 | Teng .................... G06F 1/1616 345/1.3 |
| 8,471,822 B2* | 6/2013 | Lightenberg .......... G06F 1/1616 345/173 |
| 2001/0054986 A1* | 12/2001 | Leman ......................... 345/1.1 |
| 2002/0015019 A1* | 2/2002 | Kinjo .................... G06F 3/1423 345/156 |
| 2002/0176224 A1 | 11/2002 | Dhar et al. |
| 2002/0191029 A1* | 12/2002 | Gillespie ............... G06F 3/0488 715/810 |
| 2003/0006942 A1* | 1/2003 | Searls ................... G06F 1/1616 345/1.1 |

(Continued)

FOREIGN PATENT DOCUMENTS

| | | |
|---|---|---|
| CN | 1734392 A | 2/2006 |
| JP | 2006-221665 | 8/2006 |

(Continued)

OTHER PUBLICATIONS

Synpatics cPad™ LCD TouchPad™ product description available 2004, retrieved via Internet Archive from [http://www.synaptics.com:80/products/cpad.cfm] on [Sep. 30, 2018]. 1 page (Year: 2004).*

(Continued)

*Primary Examiner* — Amy L Levy
(74) *Attorney, Agent, or Firm* — HPI Patent Department

(57) ABSTRACT

A computing device comprises a plurality of on-board displays and a graphics controller configured to control output of image content to the plurality of on-board displays in an extended display mode and/or a dual display mode.

7 Claims, 3 Drawing Sheets

(56) References Cited

U.S. PATENT DOCUMENTS

| | | | |
|---|---|---|---|
| 2003/0223183 A1 | 12/2003 | Numano | |
| 2004/0186935 A1* | 9/2004 | Bell | G06F 1/1626 710/72 |
| 2005/0114825 A1* | 5/2005 | Leung et al. | 717/100 |
| 2006/0034042 A1* | 2/2006 | Hisano et al. | 345/905 |
| 2006/0050060 A1 | 3/2006 | Chang | |
| 2006/0101349 A1* | 5/2006 | Lieberman et al. | 715/773 |
| 2006/0183505 A1* | 8/2006 | Willrich | G06F 1/1616 455/566 |
| 2007/0242421 A1* | 10/2007 | Goschin | G06F 1/1616 361/679.27 |
| 2008/0195942 A1* | 8/2008 | Marsyla et al. | 715/773 |
| 2008/0246731 A1* | 10/2008 | Chechelniker | G06F 1/1626 345/168 |

FOREIGN PATENT DOCUMENTS

| | | |
|---|---|---|
| JP | 2006221665 A | 8/2006 |
| TW | 535043 | 6/2003 |
| TW | M291151 | 5/2006 |
| TW | 200704100 A | 1/2007 |

OTHER PUBLICATIONS

International Search Report and Written Opinion dated Dec. 18, 2009, pp. 11.

Intellectual Property Office, Examination Report under Section 18(3), Appln. No. 0919443.2, dated Jun. 15, 2011, 4 p.

* cited by examiner

COMPUTING DEVICE WITH MULTIPLE DISPLAYS

BACKGROUND

Computing devices, such as a notebook computers, generally comprise a display, such as a liquid crystal display (LCD), for displaying image content to a user of the computing device. However, because of the portable nature of some of such electronic devices, the form factor of such electronic devices is reduced so that the computing device is lighter and easier to transport. Thus, as the size of the device gets smaller, so does the display, thereby making it increasingly difficult to manage the display and use of various programs or applications.

BRIEF DESCRIPTION OF THE DRAWINGS

FIG. is a diagram illustrating an enlarged view of one of the displays of the electronic device of FIG. 1.

DETAILED DESCRIPTION OF THE DRAWINGS

Figure 1:
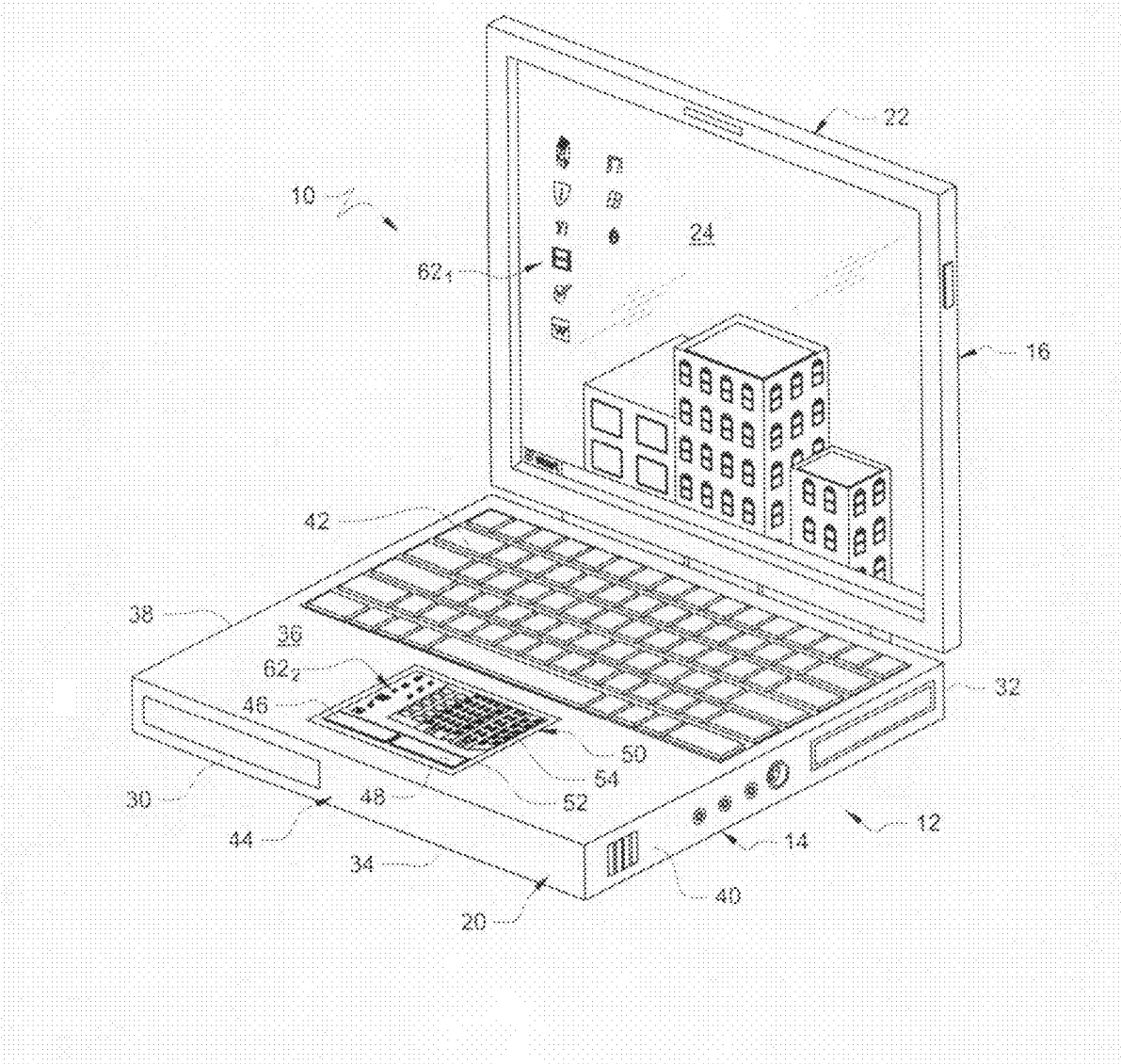
FIG. 1 is a diagram illustrating an embodiment of a computing device having multiple displays.

FIG. 1 is a diagram illustrating an embodiment of a computing device 10 having multiple on-board displays. In the embodiment illustrated in FIG. 1, computing device 10 comprises a notebook computer 12 having a base member 14 rotatably coupled to a display member 16. However, it should be understood that computing device 10 may comprise other types of devices such as, but not limited to, a tablet computer, a personal digital assistant, a gaming device, a media player, a desktop computer, or any other type of portable or non-portable computing device. In the embodiment illustrated in FIG. 1, base member 14 and display member 16 each comprise a housing 20 and 22, respectively, formed by a plurality of walls for supporting and/or otherwise storing various types of components of computing device 10 therein. For example, in the embodiment illustrated in FIG. 1, housing 22 surrounds and/or otherwise supports a primary display 24 for providing and/or otherwise displaying image content. Primary display 24 may comprise a liquid crystal display (LCD) or other type of display screen or element. In FIG. 1, housing 20 comprises a front wall 30, a rear wall 32, a bottom wall 34, a top wall forming a working surface or keyboard deck 36, and a plurality of side walls 38 and 40.

In the embodiment illustrated in FIG. 1, keyboard deck 36 is used to support a keyboard 42 and a secondary display 44 in the form of a touchscreen display 50. Touchscreen display 50 comprises a transparent touchpad 52 disposed over a display 54. Display 54 may comprise an LCD or other type of display screen or element for displaying image content. In the embodiment illustrated in FIG. 1, display 54 is disposed in base member 14 such that computing device 10 comprises one display (e.g., primary display 24) in display member 16 and another display (e.g., secondary display 44) in base member 14. However, it should be understood that the location of the multiple displays of computing device 10 may be otherwise configured (e.g., multiple displays located on display member 16). Further, in FIG. 1, two on-board displays are illustrated on computing device 10. However, it should be understood that a greater quantity of on-board displays may be provided on computing device 10. As used herein, "on-board" means a display element that is disposed on, is integral with, forms a part of and/or is otherwise located within the boundary of electronic device 10. Further, "primary" and "secondary" may be used to indicate a preference by a user of computing device 10 for displaying image content between displays 24 and 44; however, it should also be understood that "primary" and "secondary" may be used to distinguish between displays 24 and 44.

In the embodiment illustrated in FIG. 1, touchscreen display 50 is disposed on, is located within and/or is otherwise part of the working surface or keyboard deck 36 of notebook computer 12 between keyboard 42 and a portion of the working surface terminating at front wall 30 of housing 20. In FIG. 1, touchscreen display 50 is disposed adjacent a plurality of touchpad pick buttons 46 and 48 usable in cooperation with touchpad 52 for selecting and/or otherwise facilitating clickable-type input associated with touchpad 52. However, it should be understood that the quantity of touchpad pick buttons mat may vary, and may even be omitted if desired.

Figure 2:
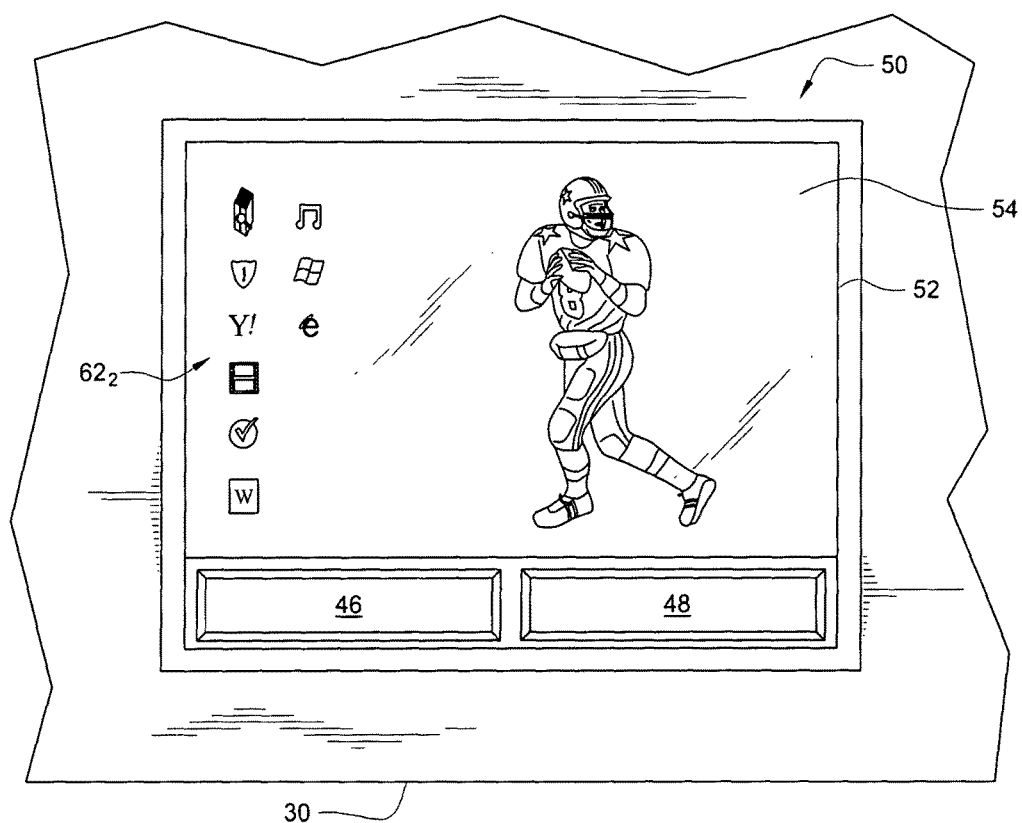

FIG. 2 is a diagram illustrating an enlarged view of touchscreen display 50 of FIG. 1. In the embodiment illustrated in FIG. 2, touchscreen display 50 comprises transparent touchpad 52 disposed above and/or over display 54 such that graphical and/or visual content output and/or otherwise displayed on display 54 is visible through transparent touchscreen 52. In operation, embodiments of computing device 10 enable use of touchpad 52 independent of image content displayed on display 54. Thus, in some embodiments, while a movie or other type of image content is being displayed on display 54, touchpad 52 may be used to receive user input associated with an application displayed on display 24 (FIG. 1). However, it should also be understood that touchscreen display 50 may be configured to operate solely as either a display element or a touchpad element (e.g., by actuating a switch, clicking on a menu function icon, depressing a particular function key, etc.).

Referring to FIG. 1, in some embodiments, computing device 10 is configured to enable image content displayed and/or otherwise capable of being displayed on display 24 to be displayed on display 54 in either a dual display mode or an extended display mode. For example, in the embodiment illustrated in FIG. 1, a desktop display $62_1$ is illustratively displayed on display 24. Embodiments of electronic device 10 enable desktop display $62_1$ to be duplicated and/or extended to display 54. Thus, in some embodiments, image content displayed and/or otherwise capable of being displayed on display 24 is displayable on display 54 of touchscreen display 50 in either an extended mode (e.g., extending display 24 to display 54) or in a dual display mode (e.g., display 55 displaying image content that is a duplicate of image content displayed on display 24). Thus, in some embodiments, image content that is displayed on display 24 may be moved and/or dragged to display 54, or image content displayed on display 24 may be independent of image content displayed on display 54, or some action initiated on display 24 (e.g., clicking on an icon) can result in populating display 54 with image content, or vice versa, or some image content on display 24 may be moved and/or extend onto display 54.

Figure 3:
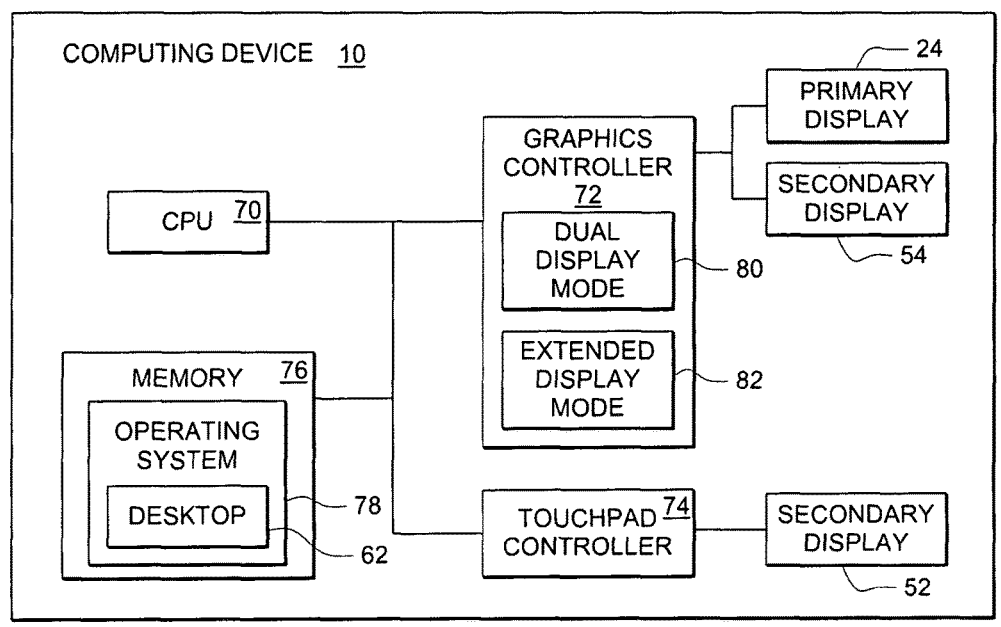
FIG. 3 is a block diagram illustrating an embodiment of the electronic device of FIG. 1.

FIG. 3 is a block diagram illustrating computing device 10 of FIG. 1. In the embodiment illustrated in FIG. 3, computing device 10 comprises a central processing unit (CPU) 70, a graphics controller 72 for controlling image and/or graphic output to displays 24 and 54, a touchpad controller 74 for controlling operation and/or communication of input associated with touchpad 52, and a memory 76. In the embodiment illustrated in FIG. 3, memory 76 comprises an operating system 78 that may be loaded and/or otherwise executed by CPU 70 to facilitate use of computing device 10 and, in some embodiments, for enabling display of desktop 62 interface.

In the embodiment illustrated in FIG. 3, graphics controller 72 comprises a plurality of display modes for presenting and/or otherwise providing image content on displays 24 and/or 54. For example, in the embodiment illustrated in FIG. 3, graphics controller 72 comprises a dual display mode 80 and an extended display mode 82. As described above, dual display mode 80 is used to output image information on display 54 that is a duplicate of image information displayed on display 24. Extended display mode 82 is used to extend display 24 to display 54 and/or otherwise extend at least a portion of displayable content from display 24 to display 54 such that displays 24 and 54 are used in combination with each other to represent a continuous and/or seamless display.

Thus, in operation, graphics controller 72 interfaces with operating system 78 and/or CPU 70 to control output of image content on displays 24 and 54 based on a particular or desired display mode. For example, in some embodiments, a user may access an interface or other type of menu option associated with graphics controller 72 to activate or deactivate a particular display mode using displays 24 and 54. Accordingly, in some embodiments, a particular software application may be selected by a user to execute and the results of that execution displayed solely on display 54 while viewing different content on display 24 (e.g., using displays 24 and 54 in an extended display mode 82 and/or as independent displays). Further, in some embodiments, in the extended display mode 82, graphical icons, applications or other image content displayed on display 24 may be dragged from display 24 onto display 54 for easy and/or quick identification thereof, and vice versa.

Additionally, in some embodiments, while image and/or graphics content is displayed on display 54, touchpad 52 remains functional so that input may be received by computing device 10 via touchpad 52 while image content (e.g., web cam output, a picture of a family, a movie, etc.) is displayed by display 54. For example, in this embodiment, for example, image content may be received from the Internet or elsewhere, in real-time or otherwise) and displayed on display 54 while e-mail and/or other applications are displayed and interacted with by a user on display 24. Thus, in this example, touchpad 52 is configured to remain functional even while image content is being displayed on display 54 such that touchpad input received by a user may be communicated to a respective application displayed on display 24.

Thus, embodiments of computing device 10 may be manufactured to enable a user to view multiple on-board displays simultaneously (i.e., the user can easily view on-board displays 24 and 54 by simply redirecting his/her glance). Further, embodiments of computing device 10 may be manufactured to enable a user to extend one on-board display to a another on-board display to facilitate an increased display area for managing and/or viewing one or more applications.

What is claimed is:

1. A computing device, comprising:
   a first housing;
   a second housing provided with a keyboard;
   a plurality of on-board displays including a first on-board display contained in said first housing and a second on-board display contained in said second housing between said keyboard and a front wall of said second housing; and
   a graphics controller configured to control output of image content to the plurality of on-board displays in a dual display mode,
   wherein the second on-board display contained in said second housing includes a touchpad, the touchpad to receive user input independent of content displayed on the second on-board display contained in said second housing.

2. The device of claim 1, wherein one of the plurality of on-board displays is disposed in a display member of the computing device and another of the plurality of on-board displays is disposed in a base member of the computing device.

3. The device of claim 1, wherein at least one of the plurality of on-board displays comprises a touchscreen display assembly.

4. The device of claim 1, wherein one of the plurality of on-board displays is disposed in a display member of a notebook computer and another of the plurality of on-board displays is disposed in a base member of the notebook computer.

5. The device of claim 1, wherein at least one of the plurality of on-board displays is part of a keyboard deck of the computing device.

6. A method for manufacturing a computer device, comprising:
   providing a plurality of on-board displays including at least one on-board display contained in a first housing and at least one on-board display contained in a second housing, wherein the at least one on-board display contained in the second housing includes a touchpad, the touchpad to receive user input independent of content displayed on the at least one on-board display contained in the second housing; and
   providing a controller configured to control output of image content to the plurality of on-board displays in a dual display mode.

7. The method of claim 6, further comprising providing a touchscreen display as at least one of the plurality of displays.

* * * * *

UNITED STATES PATENT AND TRADEMARK OFFICE
CERTIFICATE OF CORRECTION

PATENT NO. : 10,133,317 B2
APPLICATION NO. : 11/796252
DATED : November 20, 2018
INVENTOR(S) : Cameron C. Duncan It is certified that error appears in the above-identified patent and that said Letters Patent is hereby corrected as shown below:

On the Title Page

Item (56), Primary Examiner, delete "Amy L Levy" and insert -- Amy M Levy --, therefor.

Signed and Sealed this
Twenty-sixth Day of February, 2019

Andrei Iancu
*Director of the United States Patent and Trademark Office*